United States Patent
McConnell

(10) Patent No.: US 8,091,130 B1
(45) Date of Patent: Jan. 3, 2012

(54) GEOGRAPHICAL INTRUSION RESPONSE PRIORITIZATION MAPPING SYSTEM

(75) Inventor: James Trent McConnell, Keller, TX (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 1246 days.

(21) Appl. No.: 10/916,873

(22) Filed: Aug. 12, 2004

(51) Int. Cl.
*G06F 11/00* (2006.01)

(52) U.S. Cl. ............................................. 726/23; 726/25

(58) Field of Classification Search ............... 726/22–25; 709/223; 715/734, 763
See application file for complete search history.

(56) References Cited

U.S. PATENT DOCUMENTS

| | | | |
|---|---|---|---|
| 4,729,737 A | | 3/1988 | Reagan et al. |
| 5,515,285 A | | 5/1996 | Garrett et al. |
| 5,848,373 A | * | 12/1998 | DeLorme et al. ............ 701/200 |
| 5,940,598 A | | 8/1999 | Strauss et al. |
| 6,088,804 A | * | 7/2000 | Hill et al. ........................ 726/25 |
| 6,163,604 A | | 12/2000 | Baulier et al. |
| 6,240,360 B1 | | 5/2001 | Phelan |
| 6,377,987 B1 | | 4/2002 | Kracht |
| 6,430,274 B1 | | 8/2002 | Winstead et al. |
| 6,456,306 B1 | | 9/2002 | Chin et al. |
| 6,456,852 B2 | | 9/2002 | Bar et al. |
| 6,633,230 B2 | | 10/2003 | Grandin et al. |
| 6,691,161 B1 | | 2/2004 | Cook et al. |
| 6,691,256 B1 | | 2/2004 | Cook et al. |
| 6,813,777 B1 | | 11/2004 | Weinberger et al. |
| 6,816,090 B2 | | 11/2004 | Teckchandani et al. |
| 6,832,247 B1 | | 12/2004 | Cochran et al. |
| 6,839,852 B1 | * | 1/2005 | Pantuso et al. ................. 726/11 |
| 6,900,822 B2 | | 5/2005 | Germain et al. |
| 6,917,288 B2 | * | 7/2005 | Kimmel et al. ............... 340/511 |
| 6,941,359 B1 | | 9/2005 | Beaudoin et al. |
| 7,031,728 B2 | | 4/2006 | Beyer, Jr. |
| 7,082,535 B1 | | 7/2006 | Norman et al. |
| 7,146,568 B2 | | 12/2006 | Richardson |
| 7,227,950 B2 | | 6/2007 | Faith et al. |
| 7,243,008 B2 | | 7/2007 | Stockdale et al. |
| 7,260,844 B1 | | 8/2007 | Tidwell et al. |
| 7,269,796 B1 | | 9/2007 | Bayes et al. |
| 7,272,648 B2 | | 9/2007 | Kawasaki et al. |
| 7,272,795 B2 | | 9/2007 | Garding et al. |
| 7,337,222 B1 | | 2/2008 | Du et al. |
| 7,337,408 B2 | | 2/2008 | DeLuca et al. |
| 7,342,581 B2 | | 3/2008 | Vinberg |
| 7,349,982 B2 | | 3/2008 | Hannum et al. |
| 7,418,733 B2 | | 8/2008 | Connary et al. |
| 2003/0018769 A1 | * | 1/2003 | Foulger et al. ................ 709/223 |
| 2003/0115211 A1 | | 6/2003 | Chen et al. |
| 2003/0200347 A1 | * | 10/2003 | Weitzman ..................... 709/310 |
| 2003/0232598 A1 | * | 12/2003 | Aljadeff et al. .............. 455/41.2 |
| 2004/0003285 A1 | | 1/2004 | Whelan et al. |
| 2004/0044912 A1 | | 3/2004 | Connary et al. |

(Continued)

OTHER PUBLICATIONS

Brown et al., *Crime Mapping for Computer Crimes*, Charlottesville, VA, Jun. 9, 2000, 6 pages.

(Continued)

*Primary Examiner* — Kimyen Vu
*Assistant Examiner* — Suman Debnath

(57) ABSTRACT

Systems and methods for geographically mapping an intrusion into a network having one or more network points include receiving intrusion information identifying a intrusion into a point of the network, correlating the intrusion information with location information for the identified network point, and network identification information for the identified network point, and generating a map displaying a geographical location of the intrusion.

42 Claims, 9 Drawing Sheets

U.S. PATENT DOCUMENTS

| | | | |
|---|---|---|---|
| 2004/0117624 A1* | 6/2004 | Brandt et al. | 713/166 |
| 2004/0172466 A1* | 9/2004 | Douglas et al. | 709/224 |
| 2004/0233234 A1* | 11/2004 | Chaudhry et al. | 345/735 |
| 2004/0240297 A1 | 12/2004 | Shimooka et al. | |
| 2005/0206513 A1* | 9/2005 | Fallon | 340/506 |
| 2006/0004497 A1 | 1/2006 | Bull | |
| 2006/0041345 A1 | 2/2006 | Metcalf | |
| 2007/0079243 A1 | 4/2007 | Leigh et al. | |
| 2007/0204033 A1 | 8/2007 | Bookbinder et al. | |

OTHER PUBLICATIONS

Office Action, Notification Date Apr. 3, 2008, in co-pending U.S. Appl. No. 10/916,872.

* cited by examiner

| Attack Name | Attacker / Victim |
|---|---|
| Telnet Attack | 10.1.1.1 |
| Witty Worm | 10.1.1.2 |
| Telnet Attack | 10.1.2.1 |

| IP Address | Router Address |
|---|---|
| 10.1.1.1 | 02-69-8C-01-02-03 |
| 10.1.1.2 | 02-69-8C-01-02-03 |
| 10.1.2.1 | 02-69-8C-01-02-04 |

| Router Logical Address | Router Physical Address | City | State | Zip Code |
|---|---|---|---|---|
| 02-69-8C-01-02-03 | 7979 Beltline Road | Irving | TX | 75039 |
| 02-69-8C-01-02-04 | 2319 E. Fowler Avenue | Tampa | FL | 33612 |

| Attack Name | Attacker / Victim | Address | City | State | ZIP | Status | Assigned to |
|---|---|---|---|---|---|---|---|
| RPC Bo | 10.1.1.1 | 7979 Beltline Road | Irving | TX | 75039 | Fixed | Tom |
| RPC Bo | 10.1.2.1 | 2319 E. Fowler Avenue | Tampa | FL | 33612 | Open | Fred |
| SSH Bo | 10.1.1.2 | 7979 Beltline Road | Irving | TX | 75039 | Fixed | Mary |

GEOGRAPHICAL INTRUSION RESPONSE PRIORITIZATION MAPPING SYSTEM

FIELD

This invention relates to a system and method to geographically map intrusions into a network in near or post real time for a physically focused response.

BACKGROUND

When an intrusion in computer or telecommunications systems is proactively discovered to have a potential impact on an environment, response resources must be directed to a physical location. In practice, this requires extensive efforts to correlate existing threat information, router traffic information and physical location of the router and impacted/suspect device, dramatically reducing response time. For example, today, most responses to an intrusion require manual review of TCP/IP switch information, manual drawing of network "maps" and, most importantly, trying to mitigate an intrusion in a sequential or business prioritization order while these efforts are being undertaken. These response schemes do not allow for an organization's management to easily identify the geographical location of the problem(s) and the location(s) at which resources are most needed. Furthermore, current response schemes do not allow an organization's response or management team timely access to geographical view(s) of the location of the intrusions together with information relating to the status or progress of the response to the intrusion.

SUMMARY

Consistent with the invention, systems and methods for geographically mapping an intrusion into a network having one or more network points include receiving intrusion information, identifying an intrusion into a point of the network, correlating the intrusion information with location information for the identified network point, and network identification information for the identified network point, and generating a map displaying a geographical location of the intrusion.

Additional objects and advantages will be set forth in part in the description which follows, and in part will be obvious from the description, or may be learned by practice of the invention. The objects and advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 4 is an exemplary screenshot of records in an intrusion database containing intrusion information;

FIG. 5 is an exemplary screenshot of records in an ARP database;

FIG. 6 is an exemplary screenshot of records in a location database;

FIG. 7 is an exemplary screenshot of records in a map database containing information for mapping intrusions;

DESCRIPTION OF THE EMBODIMENTS

Figure 1:
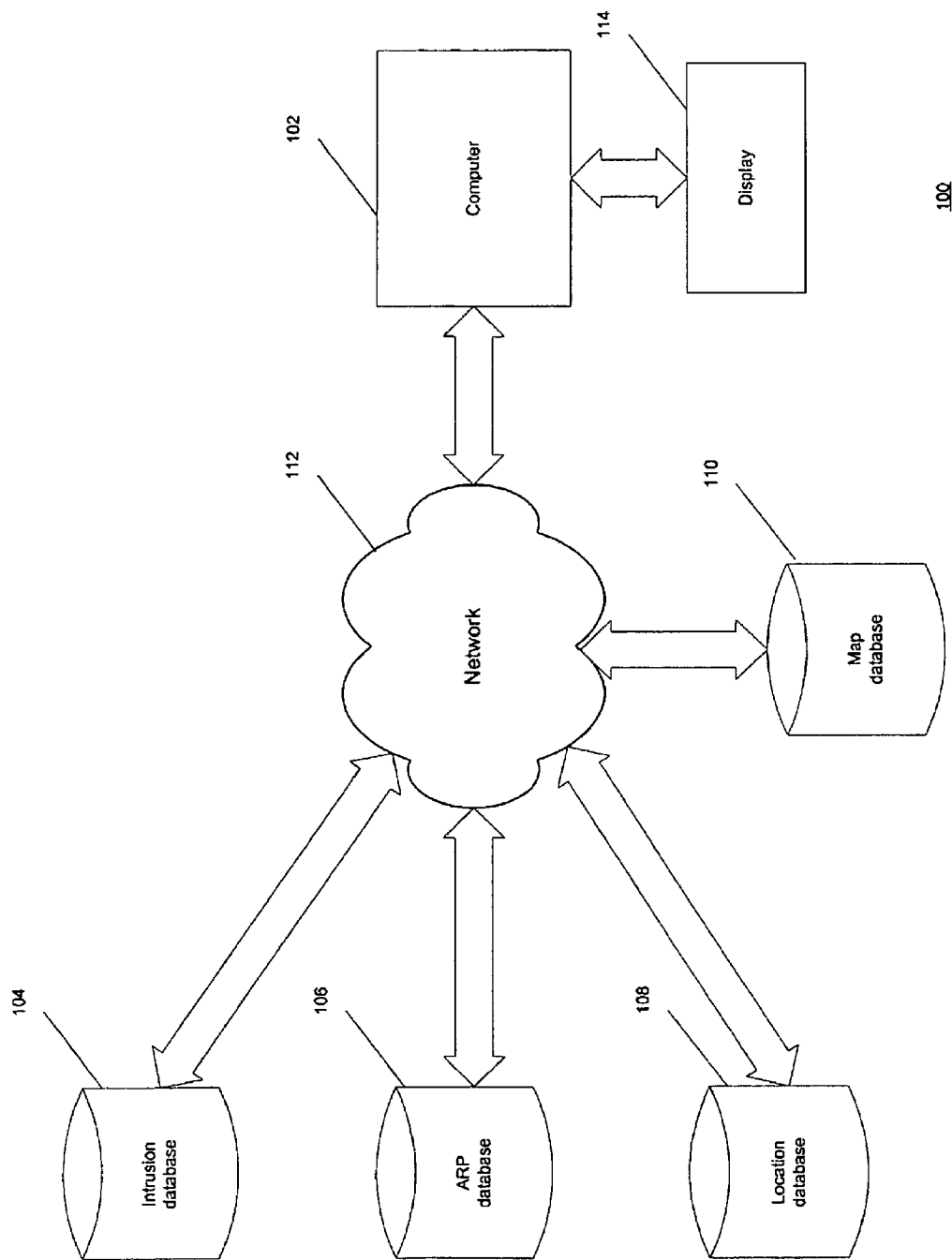
FIG. 1 is a block diagram of an exemplary environment in which the systems and methods of the present invention may be implemented.

Reference will now be made in detail to the exemplary embodiments, examples of which are illustrated in the accompanying drawings. Wherever possible, the same reference numbers will be used throughout the drawings to refer to the same or like parts. It is to be understood that both the foregoing general description and the following detailed description are exemplary and explanatory only and are not restrictive of the invention, as claimed.

As used herein, an "intrusion" is an unauthorized use, attempt, or successful entry into a digital, computerized, or automated system, requiring a response from a human administrator or response team to mitigate any damage or unwanted consequences of the entry. For example, the introduction of a virus and the unauthorized entry into a system by a hacker are each "intrusions" within the spirit of the present invention. An "intrusion response" is a response by systems or human operators to limit or mitigate damage from the intrusion or prevent future intrusions. One of ordinary skill in the art will recognize that, within the spirit and scope of the present invention, "intrusions" of many types and natures are contemplated.

In addition, as used herein, a "vulnerability" is a prospective intrusion, that is, a location in a digital, computerized, or automated system, at which an unauthorized use, attempt, or successful entry is possible or easier than at other points in the system. For example, a specific weakness may be identified in a particular operating system, such as Microsoft's Windows™ operating system when running less than Service Pack 6. Then, all computers running the Windows operating system with less than Service Pack 6 will therefore have this vulnerability. One of ordinary skill in the art will recognize that this and other vulnerabilities may be identified by commercially available software products. While methods of locating such vulnerabilities are outside the scope of the present invention, one of ordinary skill in the art will recognize that any of the vulnerabilities identified or located by such software products, now known or later developed, are within the spirit of the present invention.

In addition, as used herein, a "mitigation response" is the effort undertaken to reduce unwanted consequences or to eliminate the intrusion. For example, such a response may entail sending a human computer administrator to the site of the location to update software, install anti-virus software, eliminate a virus, or perform other necessary tasks. In addition, a response may entail installing a patch to the vulnerable computer, such as across a network. One of ordinary skill in the art will recognize that the present invention does not contemplate any specific responses. Instead, any response to an intrusion requiring the organization of resources is within the scope and spirit of the present invention.

For the ease of discussion, the following discussion will focus on the systems and methods of the present invention in terms of mapping "intrusions."

FIG. 1 is a block diagram of one exemplary environment in which the systems and methods of the present invention may be implemented. As shown in FIG. 1, system 100 employs mapping computer 102. In addition, system 100 may also employ databases such as intrusion database 104, Address Routing Protocol (ARP) database 106, location database 108, and map database 110, each in electronic communication with mapping computer 102. System 100 also includes a display 114, such as a video display, for displaying the geographic information correlated and mapped by computer 102 using the methods discussed herein, and a network 112, in electronic communication with computer 102, in which the intrusions may occur.

In one embodiment, intrusion database 104 may contain information identifying an intrusion in the system, such as, for example, the intrusion type, description, and point of possible entry or exit (i.e., network point or computer). ARP database 106 may contain network location or identification information such as the IP and/or MAC address for one or more network points representing a potential point of entry or exit (i.e., network point or computer). Location database 108 may contain geographical information such as the physical address or GPS coordinates of a potential point of entry or exit. Finally, map database 110 may correlate and contain information from the intrusion, ARP, and location databases as described below to map the intrusions.

Figure 2:
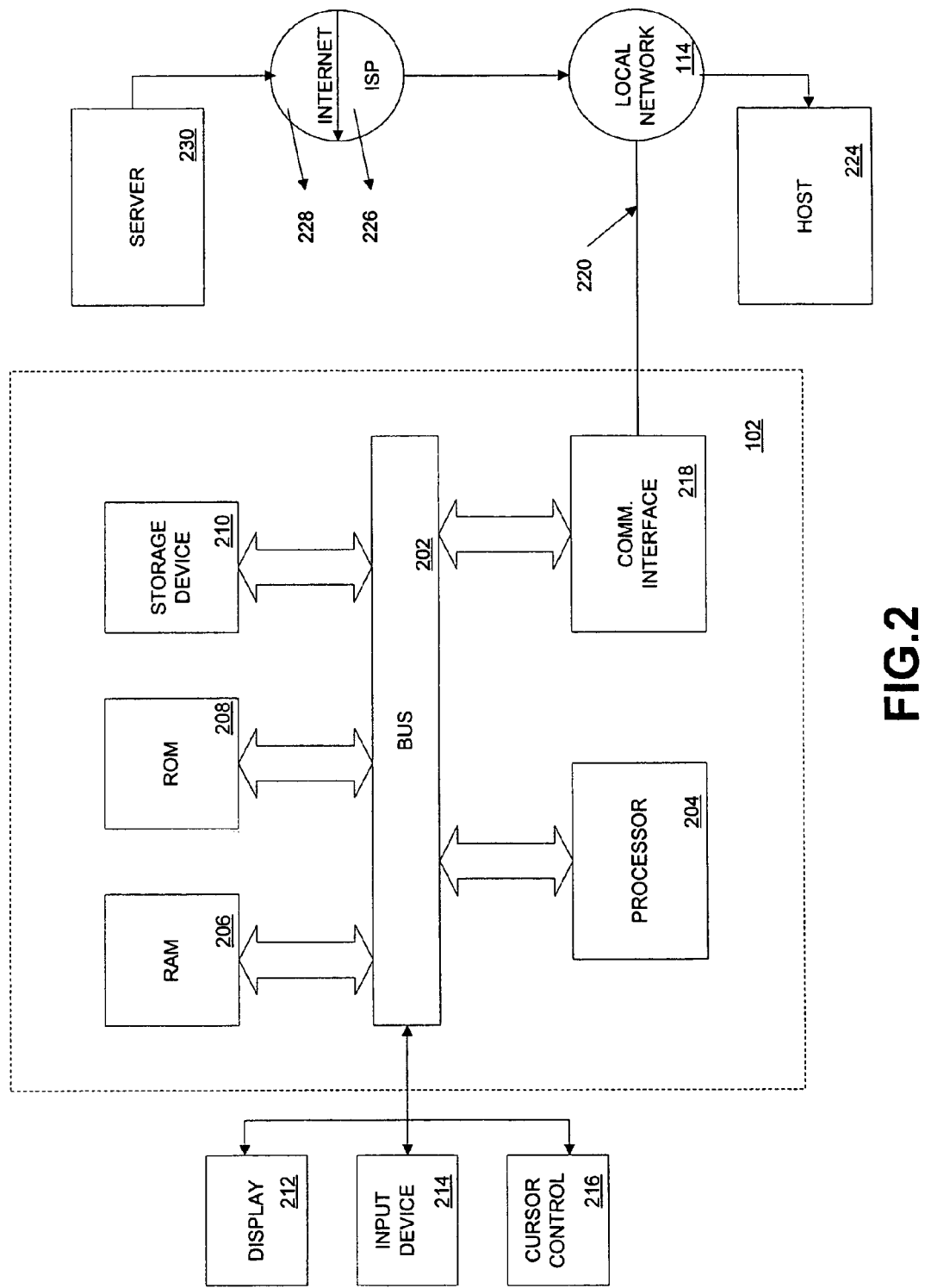
FIG. 2 is a block diagram of an exemplary embodiment of a mapping computer.

FIG. 2 is a block diagram illustrating an exemplary mapping computer 102 for use in system 100, consistent with the present invention. Computer 102 includes a bus 202 or other communication mechanism for communicating information, and a processor 204 coupled to bus 202 for processing information. Computer 102 also includes a main memory, such as a random access memory (RAM) 206, coupled to bus 202 for storing information and instructions during execution by processor 204. RAM 206 also may be used for storing temporary variables or other intermediate information during execution of instructions to be executed by processor 204. Computer system 102 further includes a read only memory (ROM) 208 or other storage device coupled to bus 202 for storing static information and instructions for processor 204. A mass storage device 210, such as a magnetic disk or optical disk, is provided and coupled to bus 202 for storing information and instructions.

Computer 102 may be coupled via bus 202 to a display 212, such as a cathode ray tube (CRT), for displaying information to a computer user. Display 212 may, in one embodiment, operate as display 114.

Computer 102 may further be coupled to an input device 214, such as a keyboard, is coupled to bus 202 for communicating information and command selections to processor 204. Another type of user input device is a cursor control 216, such as a mouse, a trackball or cursor direction keys for communicating direction information and command selections to processor 204 and for controlling cursor movement on display 212. Cursor control 216 typically has two degrees of freedom in two axes, a first axis (e.g., x) and a second axis (e.g., y), which allow the device to specify positions in a plane.

According to one embodiment, computer 102 executes instructions for geographic mapping of intrusion information. Either alone or in combination with another computer system, computer 102 thus permits the geographic mapping of intrusions in response to processor 204 executing one or more sequences of instructions contained in RAM 206. Such instructions may be read into RAM 206 from another computer-readable medium, such as storage device 210. Execution of the sequences of instructions contained in RAM 206 causes processor 204 to perform the functions of mapping computer 102, and/or the process stages described herein. In an alternative implementation, hard-wired circuitry may be used in place of, or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 204 for execution. Such a medium may take many forms, including but not limited to, non-volatile, volatile media, and transmission media. Non-volatile media includes, for example, optical or magnetic disks, such as storage device 210. Volatile media includes dynamic memory, such as RAM 206. Transmission media includes coaxial cables, copper wire and fiber optics, including the wires that comprise bus 202. Transmission media may also take the form of acoustic or light waves, such as those generated during radio-wave and infra-red data communications.

Common forms of computer-readable media include, for example, a floppy disk, flexible disk, hard disk, magnetic tape, or any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read. For the purposes of this discussion, carrier waves are the signals which carry the data to and from computer 102.

Various forms of computer-readable media may be involved in carrying one or more sequences of one or more instructions to processor 204 for execution. For example, the instructions may initially be carried on the magnetic disk of a remote computer. The remote computer may load the instructions into a dynamic memory and send the instructions over a telephone line using a modem. A modem local to computer 102 may receive the data on the telephone line and use an infra-red transmitter to convert the data to an infra-red signal. An infra-red detector coupled to bus 202 may receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer 102 may also include a communication interface 218 coupled to bus 202. Communication interface 218 provides a two-way data communication coupling to a network link 220 that may be connected to network 112. Network 112 may be a local area network (LAN), wide area network (WAN), or any other network configuration. For example, communication interface 218 may be an integrated services digital network (ISDN) card or a modem to provide a data communication connection to a corresponding type of telephone line. Computer 102 may communicate with a host 224 via network 112. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. In this embodiment, network 112 may communicate with an Internet Service Provider (ISP) 226. For example, network link 220 may provide a connection to data equipment operated by the ISP 226. ISP 226, in turn, provides data communication services from another server 230 or host 224 to computer 102.

Network 112 may use electric, electromagnetic or optical signals that carry digital data streams.

Computer 102 may send messages and receive data, including program code, through network 112, network link 220 and communication interface 218. In this embodiment, server 230 may download an application program to computer 102 via network 112 and communication interface 218. Consistent with the present invention, one such downloaded application geographically maps vulnerability or intrusion information, such as, for example, by executing methods 300 and/or 900, to be described below. The received code may be executed by processor 204 as it is received and/or stored in storage device 210, or other non-volatile storage for later execution.

Although computer system 102 is shown in FIG. 2 as connectable to server 230, those skilled in the art will recognize that computer system 102 may establish connections to multiple servers on Internet 228 and/or network 112. Such servers may include HTML-based Internet applications to provide information to computer system 102 upon request in a manner consistent with the present invention.

Returning to FIG. 1, display 114 may, in one embodiment, be implemented as display 212 (FIG. 2), directly connected to computer 102. In an alternative embodiment, display 114 may be connected to computer 102 via network 112. For example, display 114 may be a display connected to another computer on network 112, or may be a stand-alone display device such as a video projector connected to computer 102 via network 112.

In addition, databases 104, 106, 108, and 110 may each reside within computer 102 or may reside in any other location, such as on network 112, so long as they are in electronic communication with computer 102. In one embodiment, ARP database 106 may be a technical table such as the type typically resident in router points in a computer network, in which information such as the MAC address, IP address and Router (IP/MAC address) is kept.

In one embodiment, location database 108 is a static database in which the physical location of routers or network points is located. Such location information may include router (IP/MAC) address, and router (or network point) physical address (geographic location), such as GPS coordinates. Accordingly, one of ordinary skill in the art will recognize that ARP database 106 and location database 108 may be kept in accordance with any now known or later developed methods for implementing and maintaining ARP information at router points, or physical location information, respectively.

In an alternative embodiment, databases 104, 106, 108, and 110, may be implemented as a single database, or may be implemented as any number of databases. For example, one of ordinary skill in the art will recognize that system 100 may include multiple ARP databases, such as having one for each router (not shown) in the system. Similarly, system 100 may include multiple intrusion, location, and map databases. Furthermore, in one embodiment, databases 104, 106, 108, and 110 may be implemented as a single database containing all of the described information. One of ordinary skill in the art will recognize that system 100 may include any number (one or more) of databases so long as the information discussed herein may be retrieved and correlated as discussed herein.

Finally, databases 104, 106, 108, and 110 may be implemented using any now known or later developed database schemes or database software. For example, in one embodiment, each of the databases may be implemented using a relational database scheme, and/or may be built using Microsoft Access™ or Microsoft Excel™ software. While, more likely, one or more databases will be implemented to take into account other factors outside the scope of the present invention (for example, ARP database 106 may require specific format or implementation dependent on the router within which it resides), one of ordinary skill in the art will recognize that any implementation (and location) of the present databases is contemplated within the scope and spirit of the present invention.

Figure 3:
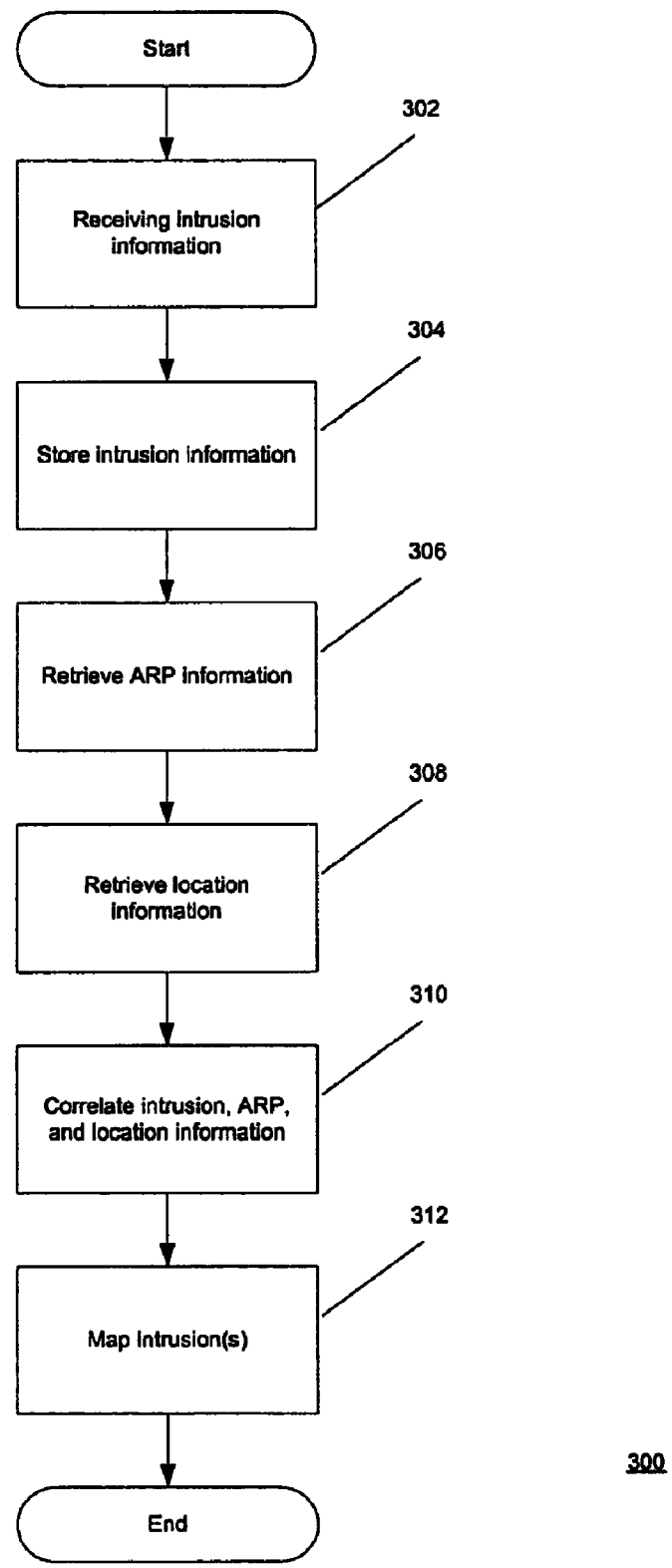
FIG. 3 is a flowchart of an exemplary method for geographically mapping response information.

FIG. 3 shows a method 300 for execution, such as by computer 102, for geographic mapping of intrusion information, consistent with the present invention. Method 300 begins by receiving intrusion information, stage 302, such as from a computer administrator, as the output of software designed to detect intrusions, from an intrusion detection system, router, network management system, security information manager, or from any other source. In one embodiment, the intrusion information may include an identification (such as the IP address) of the computer where the intrusion started or ended, the name and description of the intrusion, and possibly other data. Upon receipt of the intrusion information, it is stored in intrusion database 104, stage 304. FIG. 4 shows one embodiment of intrusion information 400 within intrusion database 104.

Returning to FIG. 3, computer 102 then retrieves, for computers (or network points) at which an intrusion started or ended, ARP information for that computer (or network point) from ARP database 106, stage 306. In one embodiment, the intrusion information (such as the IP address) may be used as a key to retrieve the appropriate record from ARP database 106. The ARP information may include the MAC address, and router IP/MAC address or any other network address information of the network point at which the intrusion started or ended, as necessary. FIG. 5 shows one exemplary embodiment 500 of the ARP information within ARP database 106.

In addition, computer 102 may also retrieve geographic location information for the computer at which the intrusion started or ended, from location database 108, stage 308. In one embodiment, the intrusion data (such as IP address) and/or the ARP data (such as the router IP/MAC address) may be used as a key to identify a record corresponding to the location database record(s), corresponding to the network point. The location information retrieved may include such information as the physical location (e.g., mailing address or GPS coordinates) for the identified network point or computer. FIG. 6 shows one exemplary embodiment 600 of the location information within location database 108.

Once this information has been retrieved from databases 104, 106, and 108, it is stored in map database 110, stage 310. Within map database 110, the retrieved information is preferably correlated such that all information for a particular intrusion is stored in a record for that intrusion. For example, FIG. 7 shows an exemplary screenshot 700 of records of map information for mapping intrusions, such as may be stored in map database 110. As shown, map database records may contain the intrusion information, the network address (such as the IP or MAC address from ARP database 106), and the physical location, such as the mailing address or GPS information (from location database 108). In addition, map database records may also include a status of the intrusion and an indication of the response person or team assigned to respond to the intrusion.

Figure 8:
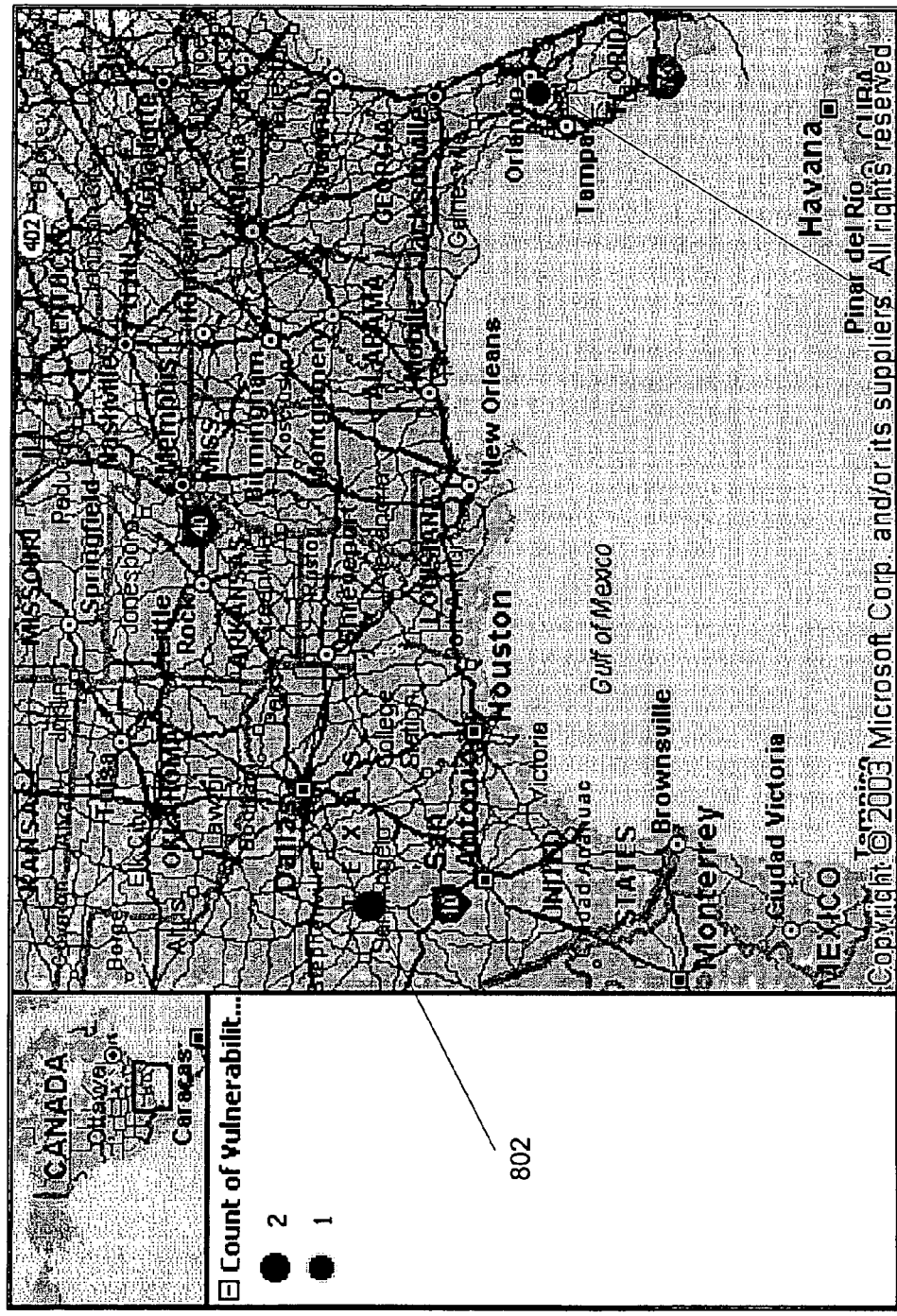
FIG. 8 is an exemplary screenshot of a map geographically mapping vulnerabilities consistent with the present invention.

Upon correlating this information within map database 110, computer 102 then maps the location of the intrusion, stage 312. In one embodiment, the location information for each record is imported into a commercially available mapping program such as MapPoint™ by Microsoft, to visually locate the intrusion points with network 112 on a map. In one embodiment, the map may represent each of the intrusions as a symbol on the map, for example, as a push pin. An exemplary map 800 using this push pin approach is shown as FIG. 8. Within map 800, each pushpin 802, 804, shows the location of a point of intrusion requiring a response.

Using map 800, response teams or system administrators will be able to identify "pockets" of intrusions and will be able to better prioritize and more efficiently schedule response personnel to respond and mitigate or eliminate the intrusion, based on geographic location. In addition, by continually updating the map and watching it change over time, system operators will be able to geographically view the spread, if any, of an intrusion. Furthermore, by also tracking system updates, the administrator will be able to identify new entry points.

Figure 9:
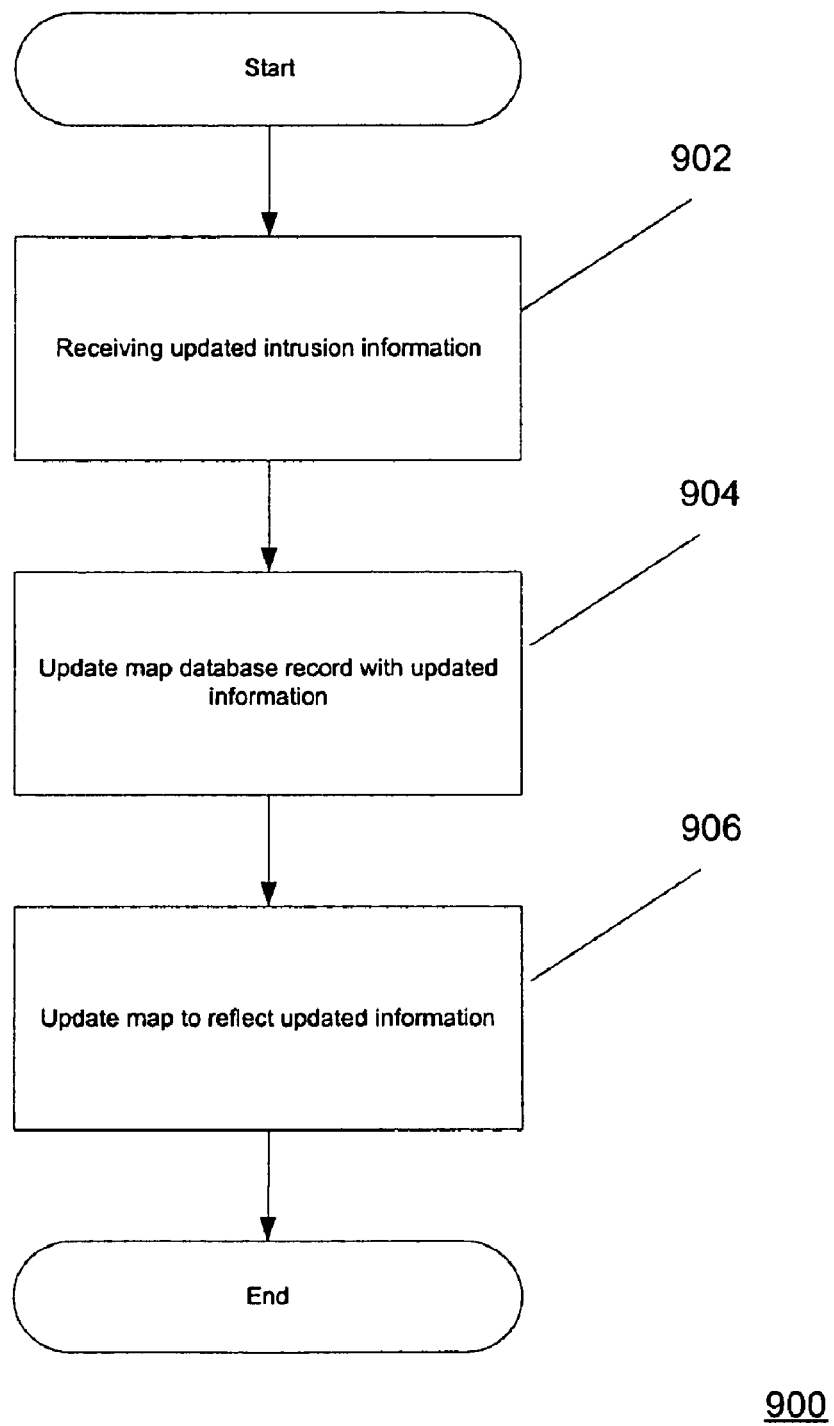
FIG. 9 is a flowchart showing an exemplary method for updating a geographic map with progress information.

FIG. 9 shows a flowchart of a method 900 for updating the geographic map with progress information. Method 900 begins with a response team or system administrator sending an update to the system to advise of a new status of a intrusion, stage 902. For example, the response team may advise the system that the intruded computer must be replaced, and be rendered inactive until it is replaced, (i.e., the intrusion is "open") or may advise the system that the intruded computer has been upgraded and is no longer compromised.

Once this information is received, the map database record for the identified intrusion is updated, stage 904. For example, each intrusion record in the database may contain a field to identify the status of the intrusion (see FIG. 7). Possible status indicators may reflect that the intrusion is "new," "open" (i.e., not yet responded to), "assigned to a response team," "closed" (i.e., responded to and fixed), or any other status that may be of use to the organization for which the system has been implemented.

Once the map database record has been updated, map computer 102 can update map 800 to reflect the updated status of the intrusion. For example, one way that map 800 can show the status information is to display color-coded push pin symbols to reflect the status. In one embodiment, a red push pin may signify an "open" or "new" intrusion, a yellow push pin may signify a intrusion that has been assigned, but not yet fixed, and a green push pin may signify a closed intrusion. By mapping this information together with the locations of the intrusions, administrators can better track the progress of their response teams, and more fluidly schedule responses to new intrusions as they arise.

One of ordinary skill in the art will recognize that, while the present invention discusses the systems and methods for mapping intrusions of a system, similar systems and methods may be utilized to map vulnerabilities to the system. For example, referring to FIG. 1, database 104 may maintain vulnerability information rather than intrusion information. Therefore, using database 104, computer 102, through the execution of methods 300 and 900, may geographically map vulnerabilities and update the status of responses to those vulnerabilities. Such methods and systems are further described in U.S. patent application Ser. No. 10/916,872, entitled "Geographical Vulnerability Mitigation Response Mapping System," filed concurrently herewith, the contents of which are incorporated by reference herein in their entirety.

One of ordinary skill in the art will recognize that any symbol or representation may be used to identify an intrusion on the map, including, but not limited to, a push-pin symbol. These symbols and representations may be used to identify the quantity of intrusions in that area of the map, such as by varying the color of the symbol to identify such quantity. In addition, the symbol or representation may be linked to the underlying data such that a user, using an input device, may select a symbol on the map causing computer 102 to display the status, quantity, address, or other information corresponding to the selected symbol.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for displaying an intrusion into a network, the method comprising:
   receiving network intrusion information indicating that a network intrusion has occurred, the network intrusion comprising an unauthorized access of a computing device connected to the network;
   identifying an Internet Protocol (IP) address associated with the computing device and corresponding to a network intrusion point at which the network intrusion has occurred;
   retrieving, from an Address Routing Protocol (ARP) database using the IP address, a router address corresponding to the network intrusion point;
   retrieving, from a location database using the retrieved router address, geographical location information corresponding to the network intrusion point;
   determining a geographical location of the network intrusion point based on the retrieved geographical location information;
   generating a geographical map displaying an area including at least the geographical location of the network intrusion point; and
   displaying a network intrusion symbol on the map to designate the geographical location of the network intrusion point.

2. The method of claim 1, wherein the network intrusion comprises a plurality of network intrusions corresponding to computers in the network.

3. The method of claim 2, wherein the plurality of network intrusions correspond to different computers in the network.

4. The method of claim 1, wherein the ARP database data originates in a router on the network.

5. The method of claim 1, wherein the network intrusion symbol is a push-pin symbol.

6. The method of claim 1, wherein the network intrusion symbol represents a quantity of intrusions.

7. The method of claim 1, wherein the method further comprises updating a status of a mitigation response to the network intrusion.

8. The method of claim 7, wherein the network intrusion symbol is a push pin symbol, and updating further comprises changing a color of the push pin symbol, the color indicative of the status of the mitigation response to the network intrusion.

9. The method of claim 1, wherein the method further comprises updating the map to reflect a change of status of a mitigation response to the network intrusion.

10. A non-transitory computer-readable storage medium containing instructions, which, when executed, perform a method for displaying an intrusion into a network, the method comprising:
    receiving network intrusion information indicating that a network intrusion has occurred, the network intrusion comprising an unauthorized access of a computing device connected to the network;

identifying an Internet Protocol (IP) address associated with the computing device and corresponding to a network intrusion point at which the network intrusion has occurred;

retrieving from an Address Routing Protocol (ARP) database using the IP address, a router address corresponding to the network intrusion point;

retrieving from a location database using the retrieved router address, geographical location information corresponding to the network intrusion point;

determining a geographical location of the network intrusion point based on the retrieved geographical location information;

generating a geographical map displaying an area including at least the geographical location of the network intrusion point; and displaying a network intrusion symbol on the map to designate the geographical location of the network intrusion point.

11. The non-transitory computer-readable storage medium of claim 10, wherein the network intrusion comprises a plurality of network intrusions corresponding to computers in the network.

12. The non-transitory computer-readable storage medium of claim 11, wherein the plurality of network intrusions correspond to different computers in the network.

13. The non-transitory computer-readable storage medium of claim 10 wherein the ARP database originates in a router on the network.

14. The non-transitory computer-readable storage medium of claim 10, wherein the network intrusion symbol in a push-pin.

15. The non-transitory computer-readable storage medium of claim 10, wherein the network intrusion symbol represents a quantity of intrusions.

16. The non-transitory computer-readable storage medium of claim 10, wherein the method further comprises updating a status of a mitigation response to the network intrusion.

17. The non-transitory computer-readable storage medium of claim 16, wherein the network intrusion symbol is a push pin symbol and updating further comprises changing a color of the push pin symbol, the color indicative of the status of the mitigation response to the network intrusion.

18. The non-transitory computer-readable storage medium of claim 10, wherein the method further comprises updating the map to reflect a change of status of a mitigation response to the network intrusion.

19. A system for geographically mapping an intrusion into a network, the system comprising:
 a map database storing map information;
 an Address Routing Protocol (ARP) database storing network location information;
 a location database storing location information;
 a computer in electronic communication with the map database and configured to:
  receive network intrusion information indicating that a network intrusion has occurred, the network intrusion comprising an unauthorized access of a computing device connected to the network;
  identify an Internet Protocol (IP) address associated with the computing device and corresponding to a network intrusion point at which the network intrusion has occurred;
  retrieve, from the ARP database using the IP address, a router address corresponding to the network intrusion point;
  retrieve, from the location database using the retrieved router address, geographical location information corresponding to the network intrusion point;
  determine a geographical location of the network intrusion point based on the retrieved geographical location information;
  generate a geographical map of an area including at least the determined geographical location of the network intrusion point;
  displaying on the map a network intrusion symbol to designate the determined geographical location of the network intrusion point; and
 a display device in electronic communication with the computer for displaying the generated map.

20. The system of claim 19, wherein the network intrusion comprises a plurality of network intrusions corresponding to computers in the network.

21. The system of claim 20, wherein the plurality of network intrusions correspond to different computers in the network.

22. The system of claim 19, wherein the computer is further configured to:
 correlate the IP address and the router address; and
 store the correlated IP address and router address in a network intrusion database.

23. The system of claim 19, wherein the ARP database originates in a router on the network.

24. The system of claim 19, further comprising a network intrusion database, wherein the computer is further configured to:
 correlate the geographical location information with the IP address and the router address; and
 store the correlated information in network intrusion database.

25. The system of claim 19, wherein the network intrusion symbol is a push pin symbol.

26. The system of claim 25, wherein the network intrusion symbol indicates a status of a mitigation response to the network intrusion.

27. The system of claim 26, wherein the computer is further configured to display a change of the status of the mitigation response to the network intrusion.

28. The system of claim 27, wherein the network intrusion symbol is a push-pin symbol, and the computer is configured to display a change in the status of the mitigation response to the network intrusion by changing a color of the push pin symbol on the map, the color indicative of the status of the mitigation response to the network intrusion.

29. The system of claim 19, wherein the network intrusion symbol indicates a status of a mitigation response to the network intrusion.

30. The system of claim 29, wherein the network intrusion symbol is a push pin, and a color of a push pin symbol indicates the status of the mitigation response to the network intrusion.

31. A system for geographically mapping an intrusion into a network, the system comprising:
 map database means for storing map information;
 Address Routing Protocol (ARP) database means for storing network location information;
 location database means for storing geographical location information;
 computing means, in electronic communication with the map database, for:
  receiving network intrusion information indicating that a network intrusion has occurred, the network intrusion comprising an unauthorized access of a computing device connected to the network;

identifying an Internet Protocol (IP) address associated with the computing device and corresponding to a network intrusion point at which the network intrusion has occurred;

retrieving, from the ARP database using the IP address, a router address corresponding to the network intrusion point;

retrieving, from the location database using the retrieved router address, geographical location information corresponding to the network intrusion point;

determining a geographical location of the network intrusion point based on the retrieved geographical location information;

generating a geographical map of an area including at least the determined geographical location of the network intrusion point;

displaying on the map a network intrusion symbol to designate the determined geographical location of the network intrusion point; and display means in electronic communication with the computer for displaying the generated map.

32. The system of claim 31, wherein the system further comprises network intrusion database means for storing network intrusion information.

33. The system of claim 32, wherein the computing means further comprises means for retrieving the network intrusion information from the network intrusion database and for storing the retrieved intrusion information in the map database.

34. The system of claim 31, further comprising an intrusion database, wherein the computing means further comprises means for storing the retrieved IP address and router address in the intrusion database.

35. The system of claim 31, wherein the ARP database means originates in a router on the network.

36. The system of claim 31, further comprising an intrusion database, wherein the computing means further comprises means storing the retrieved geographical location information in the intrusion database.

37. The system of claim 31, wherein the network intrusion symbol is a push pin symbol.

38. The system of claim 37, wherein the network intrusion symbol indicates a status of a mitigation response to the network intrusion.

39. The system of claim 38, wherein the computing means further comprises means for indicating a change of the status of the network intrusion on the map.

40. The system of claim 39, wherein the network intrusion symbol is a push pin symbol, and the means for indicating the change of the status indicates the change in the status of the mitigation response to the network intrusion by changing a color of the push pin symbol, the color indicative of the status of the mitigation response to the network intrusion.

41. A method for displaying an intrusion into a network, the method comprising:

receiving network intrusion information indicating that a network intrusion has occurred, the network intrusion comprising an unauthorized access of a computing device connected to the network;

identifying an Internet Protocol (IP) address associated with the computing device and corresponding to a network intrusion point at which the network intrusion has occurred;

retrieving, from an Address Routing Protocol (ARP) database using the IP address, a router address corresponding to the network intrusion point;

retrieving, from a location database using the retrieved router address, geographical location information corresponding to the network intrusion point;

determining a geographical location of the network intrusion point based on the retrieved geographical location information;

generating a geographical map displaying an area including at least the geographical location of the network intrusion point;

displaying a network intrusion symbol on the map to designate the geographical location of the network intrusion point;

correlating the received network intrusion information, the IP address of the computing device, the retrieved router address, and the retrieved geographical location information;

generating a network intrusion record for the intrusion based on the correlated information; and storing the network intrusion record in an intrusion database.

42. The method of claim 41, further comprising:

receiving updated intrusion information;

updating the intrusion database and the map based on the updated intrusion information.

* * * * *